Aug. 18, 1970 MAO CHANG WANG 3,524,976

BINARY CODED DECIMAL TO BINARY CONVERSION

Filed April 21, 1965 2 Sheets-Sheet 1

INVENTOR.
MAO CHANG WANG
BY
Samuel Cohen
Attorney

Aug. 18, 1970 MAO CHANG WANG 3,524,976

BINARY CODED DECIMAL TO BINARY CONVERSION

Filed April 21, 1965 2 Sheets-Sheet 2

INVENTOR.
MAO CHANG WANG
BY
Samuel Cole
Attorney

United States Patent Office 3,524,976
Patented Aug. 18, 1970

3,524,976
BINARY CODED DECIMAL TO BINARY CONVERSION

Mao Chang Wang, Westmont, N.J., assignor to RCA Corporation, a corporation of Delaware Filed Apr. 21, 1965, Ser. No. 449,826
Int. Cl. G06f 5/00
U.S. Cl. 235—155 4 Claims

ABSTRACT OF THE DISCLOSURE

The ten multiple of the most significant binary coded decimal (BCD) character is obtained by means adding the four multiple to the one multiple and means for shifting or by means adding the two multiple to the eight multiple. The ten multiple (consisting of two characters) may be added to the next most significant BCD character in a straight binary, two-character adder in one addition step to obtain the binary character corresponding to the two BCD characters.

In the straight binary system of notation, each binary digit (bit) represents a different power of 2. The least significant bit represents $2^0$, the bit of next significance $2^1$, the bit of next significance $2^2$ and so on. For example, in straight binary notation, the number 10011 is equal to $1\times2^4+0\times2^3+0\times2^2+1\times2^1+1\times2^0=19_{10}$.

In the binary coded decimal system of notation, each group of 4 bits represents one decimal character. The same number 19, as above, is represented by 0001 1001.

There are a number of applications in which it is desirable to be able quickly and easily to translate one type of notation such as described above into the other type of notation. As one example, some types of data processing systems are addressed by binary coded decimal numbers and others by straight binary numbers. If a latter system is to be made "program compatible" with the former, it is necessary, among other things, to convert the binary coded decimal address employed by the former to the corresponding binary address required by the latter, before information may be stored in or retrieved from the latter systems memory.

In accordance with the invention, the BCD to binary conversion is carried out by adding the 10 multiple of the most significant BCD character to the next lower significant BCD character. The resulting sum is the straight binary equivalent of these two BCD characters. Steps similar to these are repeated until the BCD character of least significance is reached, to complete the conversion.

The addition of the 10 multiple of one BCD character to the next lower significant BCD character may be accomplished, in accordance with the invention, in a number of different ways. In one, the BCD character is shifted 2 places to the left to obtain its straight binary 4 multiple. The 4 multiple is added to the same 4 bit BCD character unshifted and to the 4 bit BCD character of significance relatively shifted one place to the right. Another way the addition may be accomplished is to shift one BCD character one place to the left to obtain its 2 multiple and to shift the same character 3 places to the left to obtain its 8 multiple, and then to add the 2 multiple and 8 multiple to the BCD character of next lower significance.

In a preferred form of the invention, the addition of 3 characters is performed in one step by a 2 word straight binary adder.

The invention is discussed in greater detail below and is described in the following drawings of which:

Figure 1:
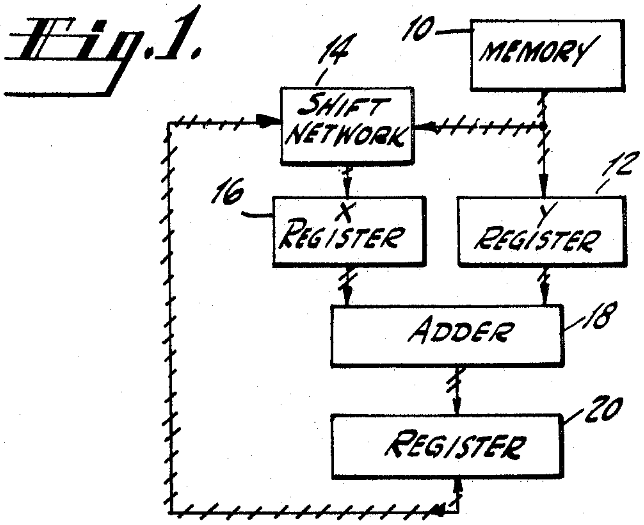
FIG. 1 is a block diagram of a portion of a general purpose computer which may be employed to practice the present invention.

In the discussion which follows, to simplify the description, the invention is illustrated initially by the conversion of a two character (8 bit) binary coded decimal (BCD) number to a binary number. The invention is, of course, applicable to the conversion of any size BCD number to a binary number and, to illustrate this, the conversion of a three or more character BCD number to a binary number is discussed later.

A simple method for converting an 8 bit binary coded decimal number to a binary number is to multiply the most significant 4 bit character by 10 and to add this 10 multiple to the least significant 4 bit binary coded decimal character. This is readily done if appropriate look-up tables for the 10 multiple are stored in the data processing machine memory. However, the storage of such tables requires memory space and is accordingly expensive and, in a small machine, not practical. Rather than operating in this way, the system of the present invention performs the conversion in a somewhat indirect way, but one which requires a relatively small amount of equipment.

In accordance with the present invention, the most significant 4 bit BCD character of an 8 bit number is shifted two places to the left. This corresponds to straight binary multiplication of the character by 4. Then, the shifted character is added to the same character in its unshifted form to thereby obtain the 5 multiple (straight binary) of the most significant 4 bit BCD character. The 5 multiple may then be added to the next least significant 4 bit binary coded decimal character which has been relatively shifted one place to the right. This may be accomplished either by actually shifting this last-named character one place to the right or by actually shifting the 5 multiple one place to the left. In either case, the shifting corresponds to obtaining the straight binary, 10 multiple. Accordingly, the last addition step corresponds to adding the 10 multiple of the most significant 4 bit BCD character to the next significant 4 bit BCD character.

The steps above may more readily be understood by applying them to a specific example. Assume it is desired to convert the BCD number 1000 0110=86 to a binary number. Hereafter, the least significant BCD character is termed the $z$ character$=z_3\ z_2\ z_1\ z_0$ and the character of next higher significance is termed the $x$ character, that is $x_3\ x_2\ x_1\ x_0$.

The first step is to shift the most significant BCD character which, in this example, is the $x$ character, two places to the left to obtain 100000. This last number is the straight binary equivalent of 32, that is, $4\times8$. Next 32 is added to 8 to obtain the 5 multiple. In binary terms:

$$\begin{array}{r} 100000 \\ +\underline{\quad 1000} \\ 101000 \end{array} = 40\text{(binary)}$$

Now, $z$, the BCD character of next lower significance, is relatively shifted one place to the right and added to the result just obtained.

$$\begin{array}{r} 101000\phantom{0} \\ +\underline{\quad 0110} \\ 1010110 \end{array} = 86\text{(binary)}$$

A circuit in almost any general purpose computer may be programmed to perform the algorithm above is shown generally in FIG. 1. The control area of the computer is implied, but is not specifically shown. This control area controls the various shifting and transfer steps which are required to implement the algorithm.

The system of FIG. 1 includes a memory 10, which may be the conventional core memory in a computer. The memory includes the memory address register, memory data register, and so on, which are not shown specifically. The memory is connected to a Y register 12 and through a shift network 14 of any suitable type to an X register 16. The X and Y registers are connected to an adder 18 and the adder is connected to a register 20. The register is connected back through the shift network 14 to the X register.

In the operation of the system of FIG 1, th.e most significant 4 bits, that is, the $x$ bits are transferred, without shifting, to the Y register 12 and through the shift network to the X register 16. The unshifted $x$ bits are hereafter termed $y$ bits, that is the bits $y_3\ y_2\ y_1\ y_0$. These bits are, of course, the same as and equal to the $x$ bits $x_3\ x_2\ x_1\ x_0$, respectively. The shift network shifts the $x$ bits two places to the left so that the X register 16 stores the 4 multiple of the $x$ character. The adder 18 adds the 4 multiple to the 1 multiple and applies the result, which is the 5 multiple, to the register 20.

During the next cycle, the X and Y registers are automatically cleared and the 5 multiple stored in register 20 is applied through the shift network 14 to the X register. The shift network shifts the 5 multiple 1 place to the left and stores the shifted word, which is the 10 multiple, in the X register The memory concurrently transfers the next lower significant BCD character $z$ to the Y register. Then the 10 multiple and the $z$ character are transferred from the X and Y registers, respectively, to the adder 18. The sum word produced by the adder is stored in the register 20 and comprises the straight binary word which is the equivalent of the two BCD characters just processed.

Figure 2:
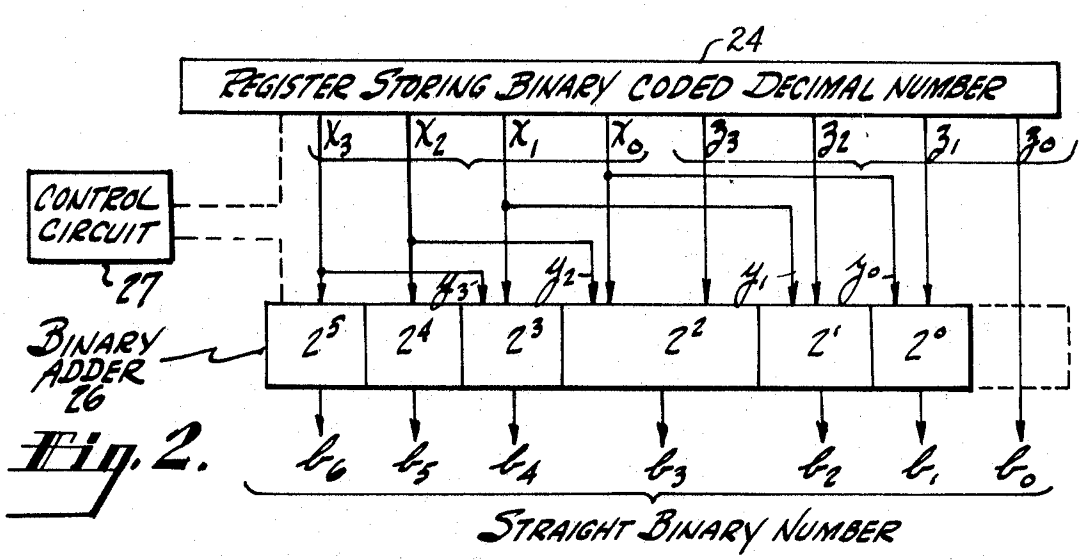
FIG. 2 is a block circuit diagram of a preferred form of the present invention.

In a preferred form of the present invention, rather than the general purpose machine described above, the special purpose apparatus of FIG. 2 is employed for the binary coded decimal to binary conversion. A register 24 storing the binary coded decimal number is connected, in the way shown, through output gates in the register, to the full binary adder 26. The control unit is shown schematically at 27 and the control lines are shown dashed. As is clear from the connections, the full binary adder, in one step, adds the following three words:

$$\begin{array}{rrrrrr} x_3 & x_2 & x_1 & x_0 & 0 & 0 \\ & & y_3 & y_2 & y_1 & y_0 \\ & & z_3 & z_1 & z_1 & z_0 \end{array}$$

During the addition, there are carries $c$ generated at the various stages. Accordingly, the bits the adder must handle, arranged in columns corresponding to the respective inputs to the successive adder stages, are $$\begin{array}{rrrrrrr} & x_3 & x_2 & x_1 & x_0 & 0 & 0 \\ & & & y_3 & y_2 & y_1 & y_0 \\ & & & z_3 & z_2 & z_1 & z_0 \\ c_5 & c_4 & c_3 & c_2 & c_1 & & \\ \hline b_6 & b_5 & b_4 & b_3 & b_2 & b_1 & b_0 \end{array}$$

where $c_1$ is the carry generated at the $2^0$ stage and applied to the $2^1$ statge, $c_2$ is the carry generated at the $2^1$ stage and applied to the $2^2$ stage, and so on; $b_6 \ldots b_1$ is the sum word produced by the adder and comprise the most significant 6 bits of a straight binary word; and, $b_0=z_0$ is the least significant bit of the binary word.

The first or $2^0$ adder stage is called upon to add only two bits $y_0$ and $z_1$ to produce the sum bit $b_1$. It. is capable of doing this. The second stage adds the three bits $y_1$, $z_2$ and $c_1$ to produce the sum bit $b_2$ and any binary full adder stage can do this. However, the third stage must add 4 bits $x_0$, $y_2$, $z_3$, and $c_2$ to produce the sum bit $b_3$. If it should happen that all 4 bits are 1, at the same time, the adder stage would be unable to perform the addition since a binary full adder stage cannot add four ones. However, as is shown below, it has been discovered that this set of conditions can never occur.

The $z$ word, in the addition discussed above, is a binary coded decimal word. Therefore, if its most significant bit $z_3$ is a 1, the next two bits $z_2$ and $z_1$ must both be equal to 0. If $z_1$ is a 0, then the addition of $z_1+y_0$ in the first stage of the adder cannot generate a carry. Therefore, if $z_3$ is a 1, $c_1$ must be a 0. If $z_3$ is a 1, it has already been stated that $z_2$ must be 0 and it has just been determined that $c_1$ must also be a 0. Accordingly, the addition in the second stage of $y_1$, $z_2$ and $c_1$ cannot cause a carry to be generated. In other words, when $z_3$ is a 1, $c_2$ must be a 0. Under these circumstances, the greatest number of 1's the third adder stage can be called upon to handle is three 1's. Of course, if $z_3$ is a 0, then $c_2$ may be a 1 but, the same situation holds, namely, that the maximum number of 1's the third stage is called upon to add is three 1's.

Figure 3:
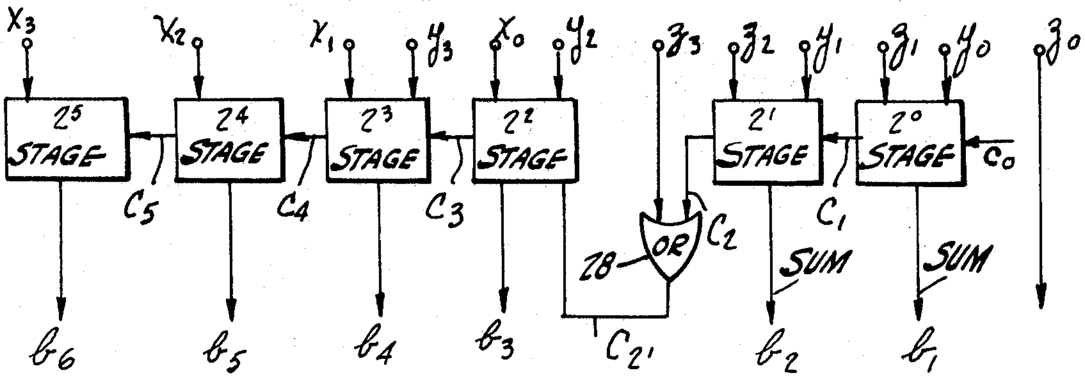
FIG. 3 is a somewhat more detailed showing of a portion of the circuit of FIG. 2.

A more detailed showing of the adder appears in FIG. 3. The input carry $c_0$, to the first, that is, the $2^0$ stage, is a 0 when the adder is being employed in the manner discussed above. $z_3$, the most significant bit of the $z$ word is applied through an OR gate 28 to the third, that is, the $2^2$ adder stage. The carry output $c_2$ of the $2^1$ adder stage is applied through the same OR gate 28 to the $2^2$ adder stage. While shown as an actual gate, in some practical applications the OR gate may be simulated by a common connection between two wires, i.e., a "phantom" OR connection.

To illustrate, in more concrete terms, the operation of the circuits above, the conversion of 86 in binary coded decimal form to 86 in binary form is given below.

The BCD equivalent of 86 is 1000 0110. The most significant character is multiplied by 4 by shifting two places to the left to give 100000. The shifted character is added to the same character unshifted and to the least significant BCD character shifted one place to the right as follows:

100000
1000
0110
-------
1010110=86(binary)

The arrangement discussed above is applicable to conversion of any BCD number to a straight binary number regardless of the number of BCD characters. One always starts with the most significant BCD character and then goes to the next significant character, to the next significant character, and on and on. As a specific example, take the binary coded decimal character $qxz$=0111 0101 1001=759. First $q$, shifted two places to the left, is added to $q$ unshifted, and $x$, shifted one place to the right as follows:

011100
0111
0101
-------
1001011=the binary equivalent of 75

Now the cycle above is repeated by adding binary 75, shifted two places to the left, to binary 75, to binary coded decimal 9, shifted one place to the right, as follows:

100101100
1001011
1001
----------
1011110111=the binary eqivalent of 759

Figure 4:
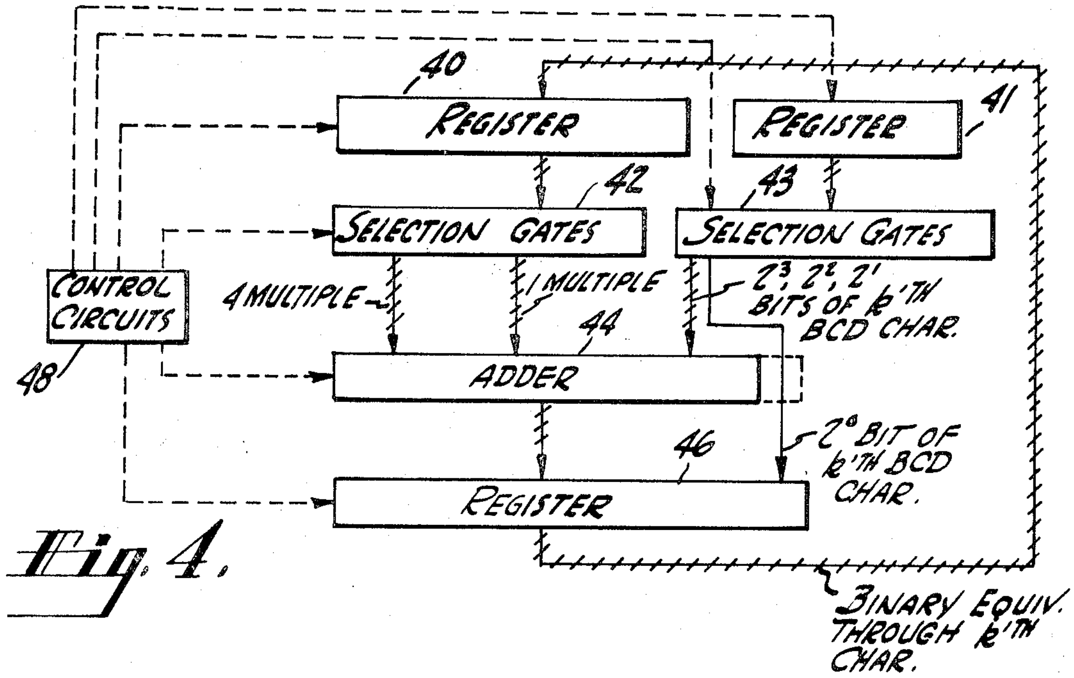
FIG. 4 is a block circuit diagram of a system for converting an $n$ character BCD number to a binary number.

A simplified block circuit diagram of a system for performing a BCD to binary conversion as described appears in FIG. 4. The system includes a first register 40 connected through selection gates 42 to a full adder 44 and a second register 41 connected through selection gates 43 to adder 44. The sum word produced by the full adder is applied to a register 46. The operation of these six circuits is controlled by control circuits 48.

The most significant BCD character 7=0111 of the BCD number 759 is initially stored in register 40 and the least significant characters 59=0101 1001 are initially stored in register 41. Upon command by a signal from the control circuits 48, the selection gates 42 apply the 4 multiple of the most significant BCD character (the character shifted two places to the left), and the 1 multiple of that same character to the adder 44 and the selection gates 43 apply the three most significant bits of the next character 5 to the adder 44. These gates 43 also apply the least significant bit of the character 5 to the register 46. The adder 44 adds the three characters to obtain 100101 the most significant 6 bits of binary 75. These 6 bits are applied to the register 46 which is already storing the least significant bit 1 of binary 75. Register 46 now stores 1001011 the binary equivalent of 75.

Upon command from the control circuits 48, register 40 is cleared and the binary equivalent of 75 is transferred to the register 40. Also, the bits in register 41 are shifted 4 places to the left. The selection gates 42 now apply to the adder the 4 multiple of 75 and the 1 multiple of the adder the 4 multiples of 75 an the 1 multiple of 75 and the selection gates 43 apply to the adder the three most significant bits of the BCD character 9. The least significant bit of the BCD character 9 is transferred directly to the register 46. The adder 44 adds the three characters it receives in the manner already discussed and produces a sum output which it applies to the register 46. The register 46 thereupon stores 1011110111, the binary equivalent of 759, having received the least significant bit of this number from the selection gates 43 and the remaining 9 bits from the adder 44.

If the initial binary coded decimal number has more than three characters, the most significant character is initially stored in register 40 and the remaining characters in register 41. The system of FIG. 4 repeats the steps described a sufficient number of times until the least significant character reaches the adder 44. The result produced, which is stored in register 46, is the binary equivalent of the BCD number. The number of cycles through the system required to convert any BCD number to a binary number is equal to $n-1$, where $n$ is the number of BCD characters making up the BCD number.

Figure 5:
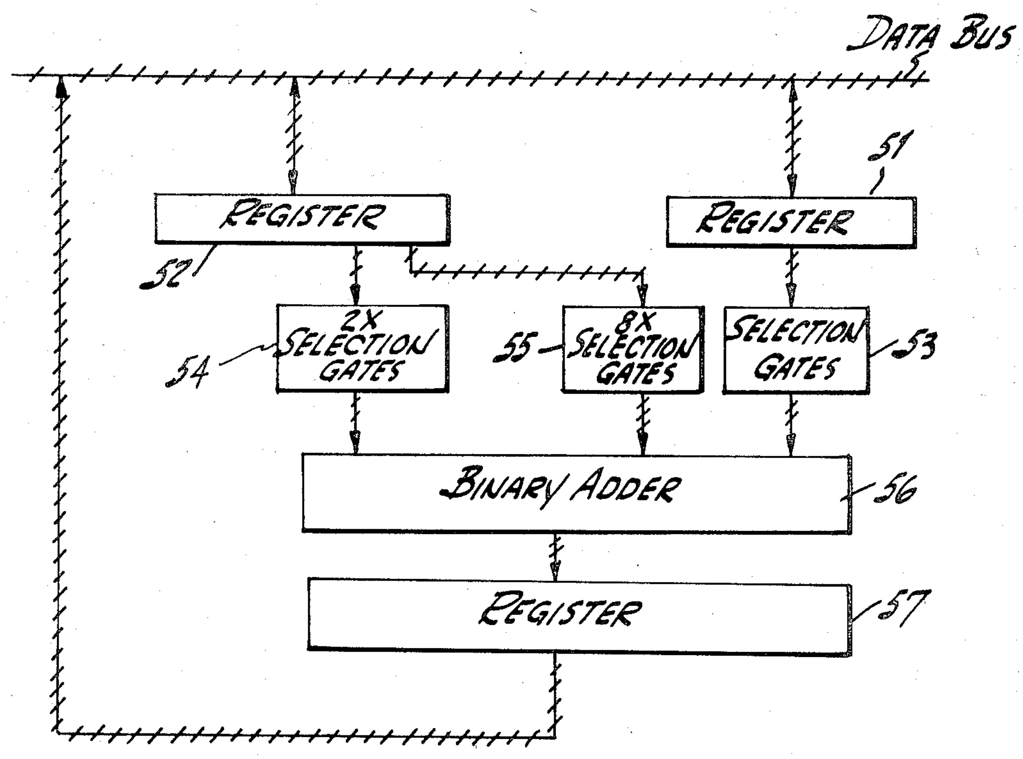
FIG. 5 is an alternate block circuit diagram of a system for converting an $n$ character BCD number to a binary number.

An alternative form of system according to the present invention appears in FIG. 5. The control circuits are similar to those of FIG. 4 and are implied but not illustrated. The circuit includes registers 51 and 52 and selection gates 53, 54 and 55. Selection gates 54 effectively multiply by 2 the number they receive. The multiplication is accomplished by a shift of the number one place to the left. Gates 55 multiply an input number by 8. Such multiplication is achieved by shifting the number three places to the left. Selection gates 53 simply apply the 4 most significant bits of a character to the 4 stages in the binary adder for adding the 4 least significant bits.

In the operation of the circuit of FIG. 5 the register 51 initially stores all the characters of a BCD number. To start with, the most significant character is applied through selection gates 53, binary adder 56 and register 57 to the 4 least significant bit positions in register 52. Thereafter, this character shifted 1 place to the left by gates 54 is applied to the binary adder and shifted three places to the left as applied to the adder by selection gates 55. The next most significant decimal character is applied through selection gates 53 to the adder 56. The adder 56 therefore adds the 2 multiple plus the 8 multiple of the most significant decimal character to the next most significant decimal character and applies the sum thereby obtained to the register 57. The addition of these 3 characters is carried out in one step in the manner already described. The register 57 transfers the sum word, which is the straight binary equivalent of the first two BCD characters, to register 52. Thereafter, 2 times the number stored in register 52 and 8 times the number are applied to the binary adder 56. At the same time the third most significant BCD character is applied from register 51 through the selection gates 53 to the adder. This third most significant character may be selected for example, by shifting the entire number stored in register 51 4 places to the left. The adder 56 adds, in one step, the 3 characters it receives and applies the sum to the register 57. This same cycle is repeated a sufficient number of times to convert the entire BCD number to a binary number, as should now be self-evident from the explanation which has already been given.

The operation of the circuit of FIG. 5 may be illustrated by the same example as above, namely, the conversion of 759 BCD to 759 binary. During the first cycle, the following addition step takes place.

$$\begin{array}{r} 0001110=2\times 7 \\ 0111000=8\times 7 \\ \underline{0101=5} \\ 1001011=75 \text{ binary} \end{array}$$

During the second cycle, the following addition step takes place.

$$\begin{array}{r} 10010110=2\times 75 \\ 1001011000=8\times 75 \\ \underline{1001=9} \\ 1011110110=759(\text{binary}) \end{array}$$

The rules developed for the conversion of a two character BCD number to a straight binary number hold also for the conversion of the three character (or greater) BCD number to a binary number and permit the two word adder to be used for each three word addition step. The reason the rules hold is that, in each case, the third character is a binary coded decimal character and if its most significant bit is a 1, its two next bits must both be 0. Accordingly, the $2^2$ or third adder stage in the case of FIG. 4 and the $2^3$ or fourth adder stage in the case of FIG. 5, can never receive more than three 1's to add at any one time.

What is claimed is:

1. A binary coded decimal to binary converter comprising, in combination:
   - means for storing a binary coded decimal number;
   - a two word adder; and
   - means for transferring from the storing means to the adder, for addition in one step, the most significant four digit binary coded decimal character Y of said number, the same character relatively shifted 2 digits to the left with respect to Y, and the four digit binary coded decimal character of next significance relatively shifted 1 digit to the right with respect to Y.

2. A binary coded decimal to binary converter comprising, in combination:
   - storage means including means for storing an $n$ character binary coded decimal number, where $n$ is an integer;
   - a two word adder;
   - means for transferring from said storage means to the adder, for addition in one step, the $n$'th or most significant binary coded decimal character Y of said number, the same character relatively shifted 2 places to the left with respect to Y, and the $(n-1)$th binary coded decimal character relatively shifted 1 place to the right with respect to Y;
   - means for transferring to said storage means the binary number produced by the adder;
   - means for transferring from the storage means, for addition in one step, the binary number B produced by the adder, the same binary number relatively shifted 2 places to the left with respect to B, and the next significant binary coded decimal character Z relatively shifted one place to the right with respect to the least significant four bits of B; and
   - means for causing the means of the preceding two subparagraphs to continue to operate until the least significant binary coded decimal character has been added.

3. A binary coded decimal to binary converter comprising, in combination:

means for storing a binary coded decimal number;

a two word adder; and means for transferring from the storing means to the adder, for addition in one step, the most significant binary coded decimal character of said number shifted one place to the left, the same character relatively shifted three places to the left, and the binary coded decimal character of next significance relatively unshifted said relative shifts being with respect to said binary coded decimal character of next significance.

4. A binary coded decimal to binary converter comprising, in combination:

storage means including means for storing an *n* character binary coded decimal number, where *n* is an integer;

a two word adder;

means for transferring from said storage means to the adder, for addition in one step, the *n*'th or most significant binary coded decimal character of said number shifted one place to the left with respect to a reference position, the same character relatively shifted three places to the left with respect to said reference position, and the (*n*—1)th binary coded decimal character relatively unshifted with respect to said reference position;

means for transferring to said storage means the binary number produced by the adder;

means for transferring from the storage means, for addition in one step, the binary number produced by the adder shifted one place to the left with respect to a reference position, the same binary number relatively shifted three places to the left with respect to said reference position; and the (*n*—2)'nd binary coded decimal character relatively unshifted so that its three most significant bits align with the three least significant bits of the binary number shifted one place to the left; and means for causing the two means described to continue to operate until the least significant binary coded decimal character has been added.

References Cited

UNITED STATES PATENTS

| | | | |
|---|---|---|---|
| 3,185,825 | 5/1961 | McDonald et al. | 235—155 |
| 2,894,686 | 7/1959 | Holmes | 235—155 |
| 3,026,035 | 3/1962 | Couleur | 340—347 |
| 3,160,872 | 12/1964 | Anderson et al. | 340—347 |
| 3,237,185 | 2/1966 | Yen et al. | 340—347 |

OTHER REFERENCES

Camp, IBM Technical Disclosure Bulletin, vol. 2, No. 6, April 1960, p. 46.

MAYNARD R. WILBUR, Primary Examiner

J. GLASSMAN, Assistant Examiner

U.S. Cl. X.R.

340—347